March 12, 1957     F. H. STARK     2,784,542
APPARATUS FOR THE PACKAGING OF CHEESE AND THE LIKE
Filed Jan. 24, 1950     7 Sheets-Sheet 1
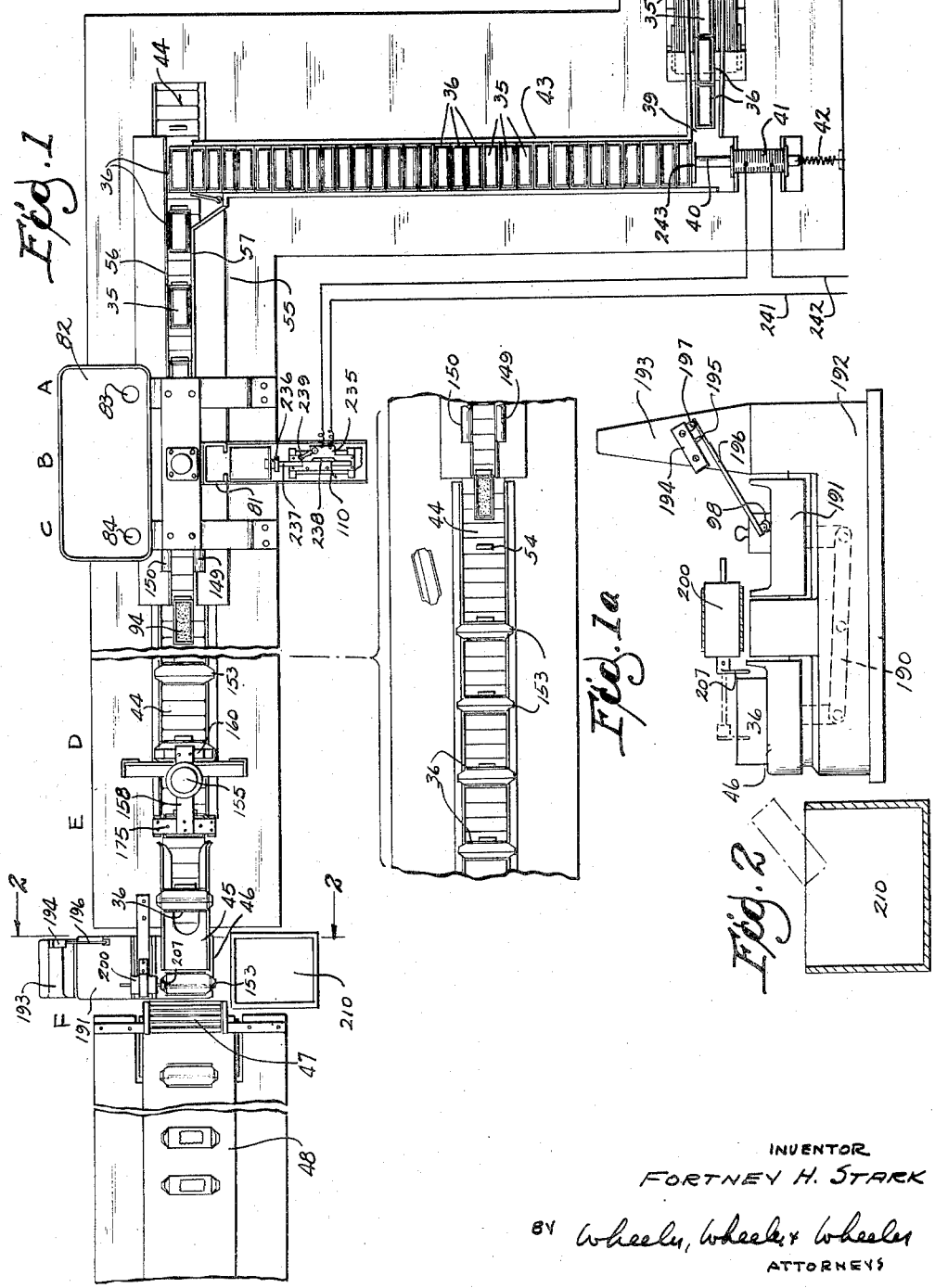
INVENTOR
FORTNEY H. STARK
BY Wheeler, Wheeler & Wheeler
ATTORNEYS March 12, 1957  F. H. STARK  2,784,542
APPARATUS FOR THE PACKAGING OF CHEESE AND THE LIKE
Filed Jan. 24, 1950  7 Sheets-Sheet 2
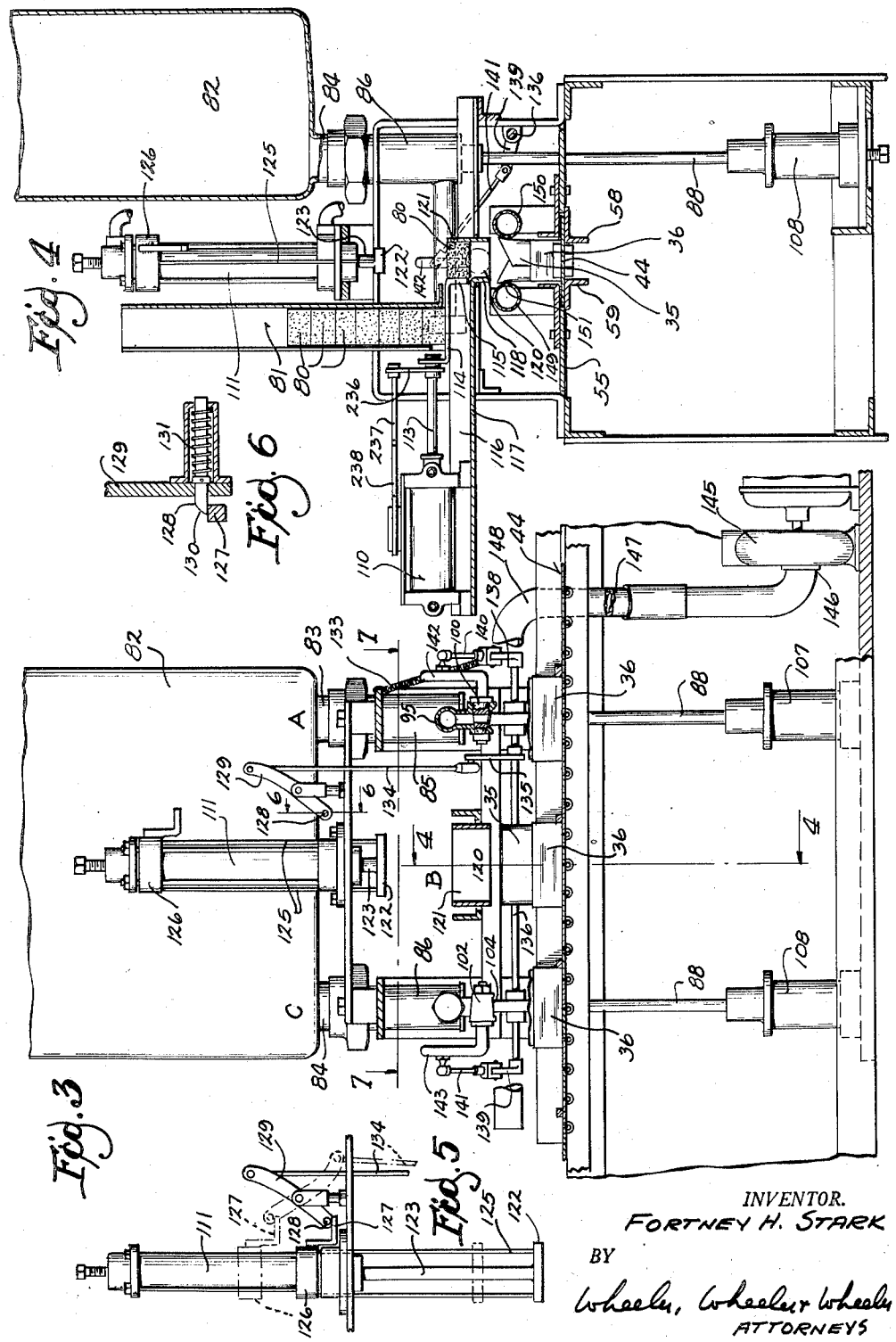
INVENTOR.
FORTNEY H. STARK
BY
Wheeler, Wheeler & Wheeler
ATTORNEYS

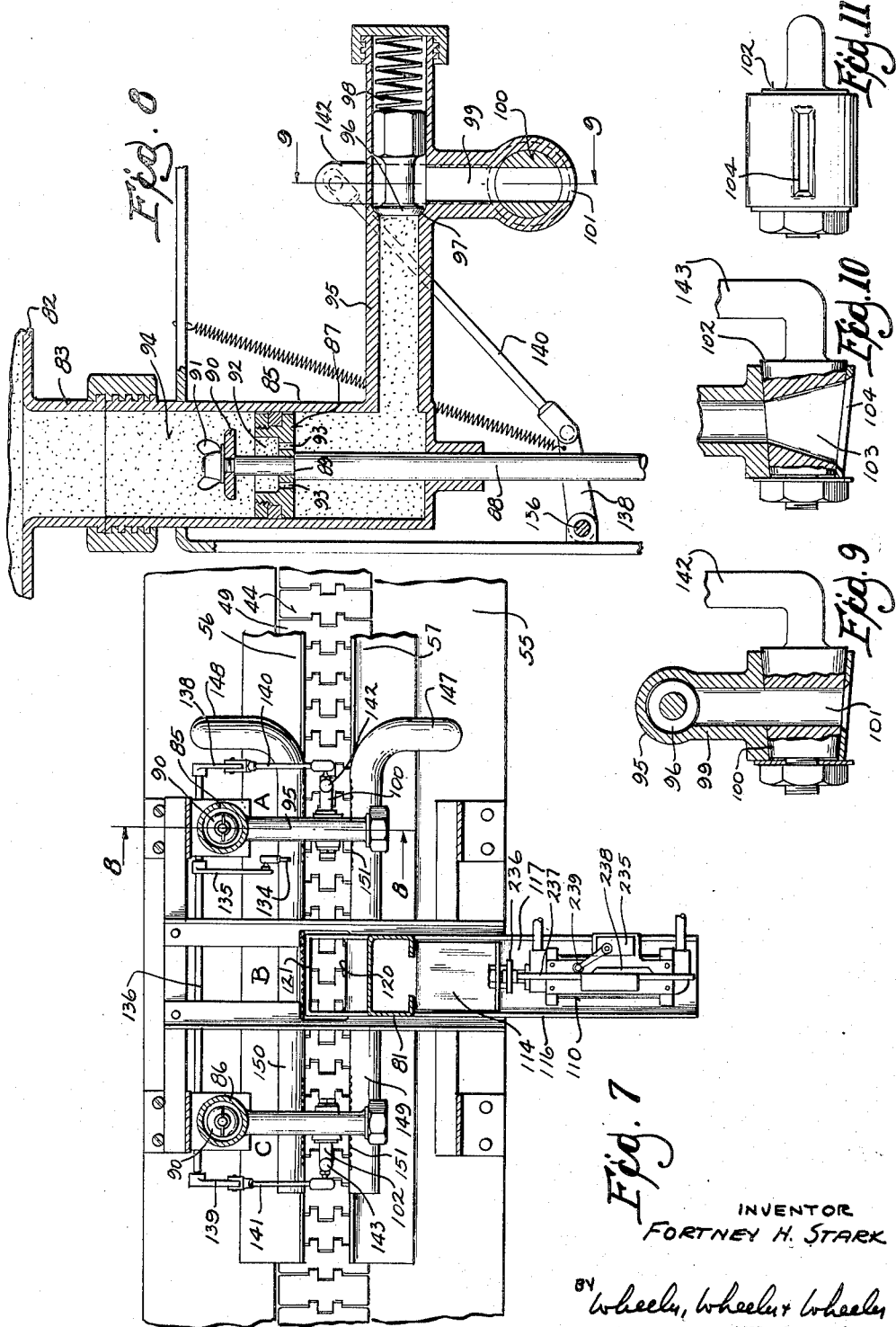

March 12, 1957  F. H. STARK  2,784,542
APPARATUS FOR THE PACKAGING OF CHEESE AND THE LIKE
Filed Jan. 24, 1950  7 Sheets-Sheet 4

INVENTOR
FORTNEY H. STARK
BY Wheeler, Wheeler & Wheeler
ATTORNEYS

March 12, 1957  F. H. STARK  2,784,542
APPARATUS FOR THE PACKAGING OF CHEESE AND THE LIKE
Filed Jan. 24, 1950  7 Sheets-Sheet 5
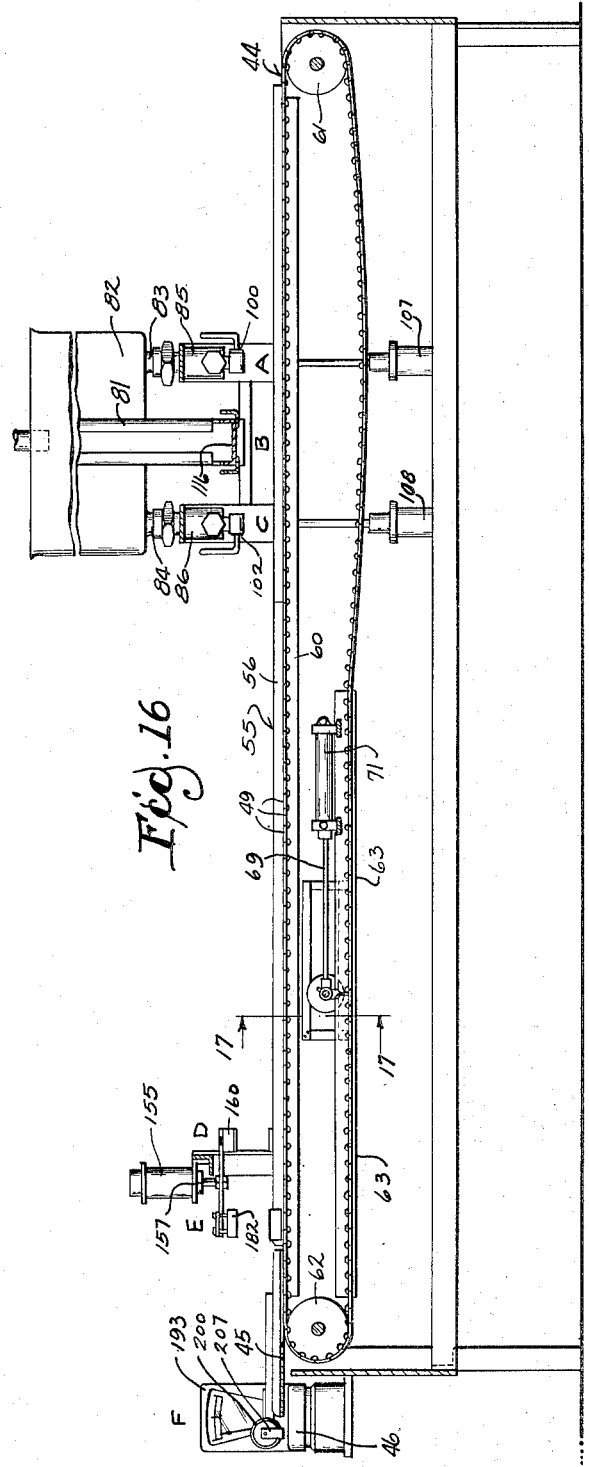
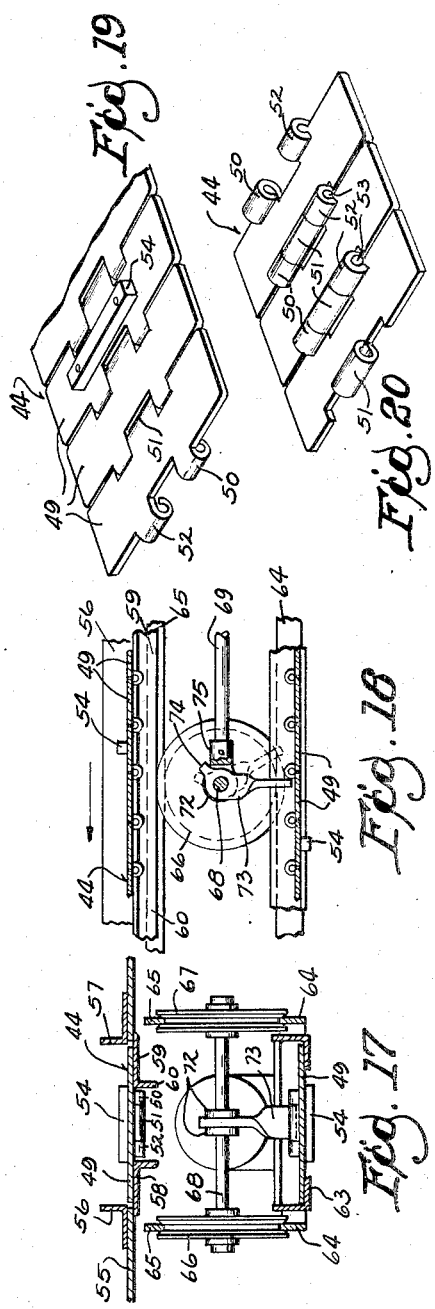
INVENTOR
FORTNEY H. STARK
BY Wheeler, Wheeler & Wheeler
ATTORNEYS

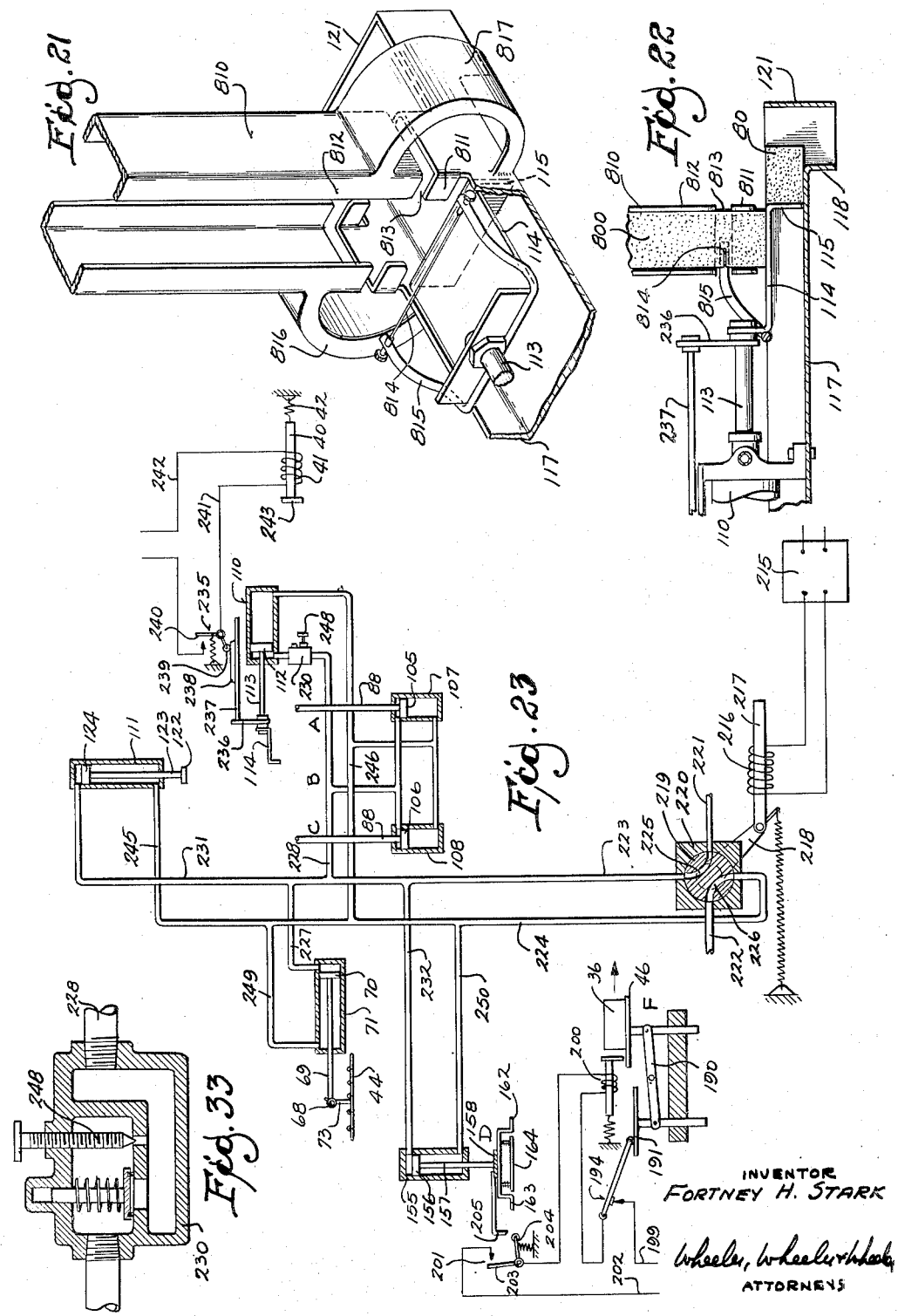

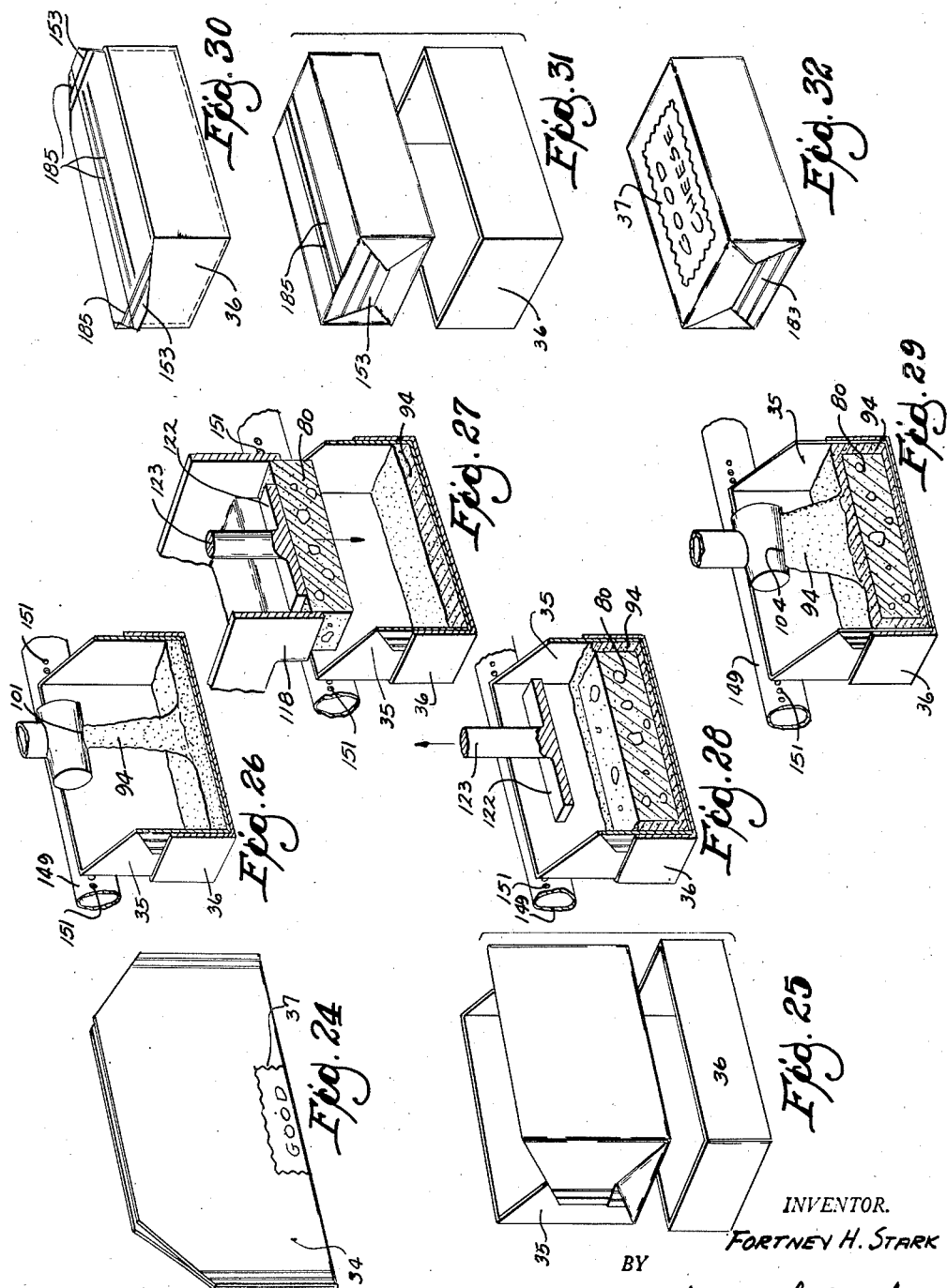

United States Patent Office 2,784,542
Patented Mar. 12, 1957

2,784,542

APPARATUS FOR THE PACKAGING OF CHEESE AND THE LIKE

Fortney H. Stark, Wauwatosa, Wis.

Application January 24, 1950, Serial No. 140,326

17 Claims. (Cl. 53—239)

This invention relates to improvements in apparatus for the packaging of cheese and the like.

The objects of the invention include the following:

It is one of the objects of the invention to provide methods and apparatus for mechanically bonding a wrapper to a block of natural cheese for the purposes of my invention disclosed in companion application 39,875, filed July 21, 1948, now abandoned. In this connection, it is desired to use open boxes as molds in which a partially prefabricated wrapper is inserted in the manner of a liner, a measured increment of molten cheese being deposited in the bottom of the partially prefabricated wrapper supported by the box, after which the block of natural cheese is pushed into the fluid, pasteurized cheese to displace the latter upwardly about the sides of the block of natural cheese. A further charge of pasteurized cheese is then deposited on the top of the block to fill the prefabricated portion of the wrapper, which is then folded down into pressure engagement with the contents and sealed.

At some point in the operation following the filling of the prefabricated wrapper within the box or mold, it is desired to weigh the package or partially completed package and eject from the line any which are underweight.

At some point following the filling of the prefabricated package, and preferably following the closing and sealing thereof, it is desired to remove the completed wrapper and its contents from the box which has served as a mold during the packaging operation, the box being then returned for re-use in further packaging.

In connection with the deposit of pasteurized cheese into the prefabricated package, it is desired to provide means whereby, under certain conditions of operation, the pasteurized cheese may be cut off at the nozzle to prevent it from "stringing."

It is a further object of the invention to provide improved means for delivering successive blocks of cheese or the like into the wrappers, either in the form of pre-cut blocks from a hopper or in the form of blocks which are cut at the time of delivery from an elongated strip of material. In this connection, it is desired to provide means which will first deliver a block of cheese to a position immediately above the mold-supported wrapper and support it in position to be discharged under pressure downwardly into the wrapper with sufficient force to displace some of the pasteurized cheese previously placed therein.

It is a further object of the invention to provide sealing apparatus in which the same operation which heat seals a previously closed package will compress the folds of the wrapper of the next preceding package to facilitate the heat sealing operation on the latter package when it reaches the heat seal station.

It is a further object of the invention to provide a novel and extremely simple means for ejecting underweight packages subject to the control of a weighing device which is completely free for movement for a sufficient period to strike an accurate balance before the ejecting means becomes effective, if the package is underweight.

It is a further object of the invention to provide simple and effective means for the synchronous operation of a number of pneumatic and electrical devices all subject to the control of a single electrical timer which can be adjusted as to time interval and dwell.

Still other objects of the invention will be more apparent in the course of the following disclosure thereof, reference being made to the accompanying drawings wherein:

Fig. 1 is a plan view of my device embodying the invention, portions being broken away.

Fig. 1a is a plan view of a portion of the conveyor system omitted from Fig. 1.

Fig. 2 is an enlarged detail view taken in section on the line 2—2 of Fig. 1.

Fig. 3 is an enlarged fragmentary detail view in front elevation of the portion of the machine in which the material to be packaged is inserted in the wrapper, the hopper being broken away.

Fig. 4 is a sectional view taken on line 4—4 of Fig. 3.

Fig. 5 is a fragmentary detail view in front elevation showing the operation of some of the parts illustrated in Fig. 3.

Fig. 6 is a detail view taken in cross section on an enlarged scale on the line 6—6 of Fig. 3.

Fig. 7 is a plan view of the conveyor table and associated parts at the filling station, the super-structure being broken away in section on the line 7—7 of Fig. 3.

Fig. 8 is a further enlarged detail taken in cross section through one of the filling spouts for pasteurized cheese on line 8—8 of Fig. 3.

Fig. 9 is a view taken in section on the line 9—9 of Fig. 8.

Fig. 10 is a fragmentary detail view in corresponding section through the other filling spout.

Fig. 11 is a bottom plan view of the filling spout shown in Fig. 10.

Fig. 16 is a view in side elevation of the conveyor chain in the filling, sealing and weighing section of the machine, the front of the casing and other parts being broken away.

Fig. 17 is an enlarged detail view taken in transverse section on the line 17—17 of Fig. 16.

Fig. 18 is an enlarged fragmentary detail view of the ratchet mechanism of Fig. 17 in longitudinal section.

Fig. 19 is a fragmentary detail view in perspective of the top surface of a preferred type of conveyor employed in this section of the apparatus.

Fig. 20 is an enlarged fragmentary detail view in perspective of the inverted conveyor shown in Fig. 19.

Fig. 21 is an enlarged detail view in perspective fragmentarily illustrating the modified embodiment in which blocks of cheese are cut as an incident to their delivery.

Fig. 22 is a detail view in longitudinal section through portions of the modified embodiment shown in Fig. 21.

Fig. 23 is a diaphragm of electrical and pneumatic means for operating the apparatus of the invention.

Fig. 24 is a view in perspective of a partially prefabricated wrapper for use in connection with the present invention.

Fig. 25 is a view in perspective showing the wrapper of Fig. 24 erected for filling and about to be inserted in a box which serves as a mold.

Fig. 26 is a sectional view in perspective showing the initial deposit of pasteurized cheese in the bottom of the erected wrapper supported by the mold.

Fig. 27 is a view in perspective section showing a block of natural cheese being delivered into the wrapper in which the pasteurized cheese has been deposited in accordance with Fig. 26.

Fig. 28 is a view in sectional perspective showing the pressure plate rising after having forced the block of natural cheese down into the previously deposited pasteurized cheese in the wrapper.

Fig. 29 is a view in sectional perspective showing further deposit of pasteurized cheese onto the surface of the natural cheese and merging with the previously deposited and displaced pasteurized cheese in the mold-supported wrapper to complete the filling of the package.

Fig. 30 is a view in perspective showing the package closed and heat sealed.

Fig. 31 shows the package in process of being removed from the mold, the package and mold being illustrated in perspective.

Fig. 32 is a view in perspective showing the completed package inverted to display the trademarked portion of the wrapper in position for sale.

Fig. 33 is a detail view of a combination check valve and needle valve.

Figure 15:
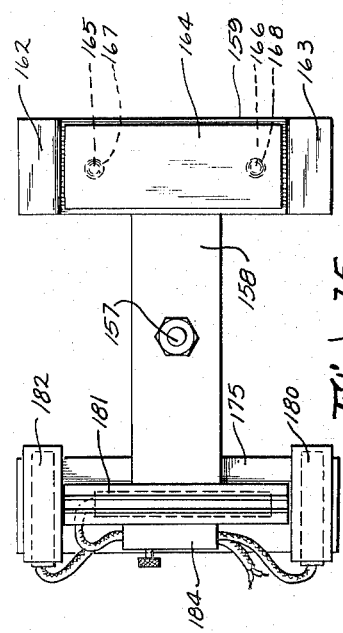
Fig. 15 is an enlarged detail view in bottom plan of the heat sealing and preliminary presser shown in Figs. 12 to 14.

While, from a broad standpoint, it is immaterial to many phases of the present invention how the wrappers are prepared to receive the cheese, it is desired that the wrappers be mold-supported for the reason that the packaging method subjects the wrapper to considerable pressure. Accordingly, it is found desirable for the purposes of this invention that the wrapper be supplied in the folded form shown in Fig. 24 with all of its folds and seals completed except for the flaps through which filling is to be effected. The partially prefabricated wrapper 34 is readily erected as shown at 35 and placed in a shallow tray or box 36 which serves as a mold and for which the prefabricated and erected wrapper 35 virtually constitutes a liner. The portion of the wrapper bearing the trademark or label 37 is at the bottom of the tray 36 at this point.

A whole series of mold units 36 lined with prefabricated and erected wrappers 35 are placed on the conveyor 38 for delivery frictionally over the apron 39 into the path of a feed conveyor 40 which may take the form of a plunger actuated intermittently by a solenoid 41 and normally retracted by spring 42. At each energization of the solenoid 41, the plunger 40 is moved to the position shown in Fig. 1 to advance a whole series of the mold and wrapper units through the conveyor trough 43 for delivery of the most advanced of such units onto the conveyor 44, details of which are shown in Figs. 16 to 20 and will later be described.

Conveyor 44 has a step-by-step movement past filling station A, B and C, wrapper-compressing station D and wrapper-sealing station E. It finally delivers the wrapped and sealed packages, still in the molds 35, onto an apron 45 from which successively arriving packages force the respective, more advanced packages onto a scale platform 46 at the weighing station F. Deficient packages are ejected laterally at this point, while packages of adequate weight are pushed across the roller apron 47 onto the discharge conveyor 48, where manually or otherwise, the packages are removed from the mold and boxed for shipment. As best shown in Figs. 16 to 20, inclusive, the conveyor 44 may conveniently comprise a series of plates 49 having registering ears 50, 51, 52 hingedly connected by pintles 53. The ears are desirably located beneath the load-carrying surface of the conveyor which is relatively flat as shown in Fig. 1. At intervals, certain of the plates carry work-propelling lugs 54. The conveyor table 55 provides upstanding flanges 56, 57, for guiding molds propelled by the lugs 54 upon the conveyor. The table may include plates 58, 59 (Fig. 17) upon which the plates 49 of the conveyor rest, the said plates being flanged at 60 to confine the aligned ears 50, 51 and 52. These ears coact with the sprockets or guide wheels 61, 62 at the ends of the conveyor.

A track is provided at 63 (Figs. 16 to 18) for the support of the plates 49 of the return run of conveyor 44 to facilitate the action thereon of the propelling mechanism. The rails 64 and 65 guide flanged wheels 66, 67 connected by an axle 68 for maintaining such axle in the plane of the axis of plunger 69 which is pneumatically operated by a piston 70 in cylinder 71. The bifurcated end portions 72 of the plunger center between them a pawl 73 which is pivoted on the axle 68 and provided with a lug 74 which strikes the head 75 on plunger 69 in the position of the parts shown in Fig. 18 to preclude clockwise oscillatoin of the pawl from such position, while permitting the pawl freedom of oscillation counterclockwise from said position. On each stroke of piston 70 and plunger 69 to the left as viewed in Figs. 16 and 23, the pawl 73 ratchets freely over the ears of the conveyor plates 49 in a retractive stroke respecting the conveyor. In each return movement of plunger 69 to the right as viewed in Figs. 16, 18 and 23, the pawl engages the ears to carry with it the lower run of the conveyor, thus advancing the conveyor one step. The length of advance depends on the number of ears over which the pawl ratchets in the outward stroke of plunger 69. Since the pneumatic connections to the cylinder 71 have controls in common with other pneumatic cylinders, these will be described later.

The major purpose of the method and apparatus is to package blocks of natural cheese which, in the preferred embodiment of the invention, are fed by gravity at 80 through a hopper 81 (Fig. 4). In order to protect the block 80, and to achieve other advantages as set forth in my companion application 39,875, pasteurized cheese in a semi-fluid condition is also delivered into the wrapper. The pasteurized cheese, heated to sufficient fluidity in any desired manner, is temporarily stored in a tank 82 having outlets at 83 and 84 at stations A and C, respectively, these communicating with cylinders 85 and 86. These may be identical and cylinder 85, as illustrated in Fig. 8, is typical.

In each cylinder is reciprocable a valved piston 87 with respect to which the piston rod 88 has limited relative movement. A shoulder at 89 limits this movement in one direction and a washer 90 secured by wing nut 91 to the top of the piston rod not only acts as a valve but limits movement in the other direction. When the rod is moving upwardly as shown in Fig. 8, there is clearance between the washer 90 and the top of the piston, thereby exposing the piston cavity 92 from which ducts 93 open through the piston. In this upward direction of movement of the rod and piston, the pasteurized and relatively fluid cheese shown at 94 passes freely through the piston to the portion of the cylinder 85 therebeneath.

When the movement of the piston rod 88 is reversed, it moves downwardly until the washer 90 closes the cavity 92, thus precluding further flow of cheese through the piston. The washer engages the top surface of the piston about the cavity, thus seating the valve and transmitting motion to the piston to displace downwardly through the cylinder and outwardly through pipe 95 such of the cheese as is trapped below the piston.

The pressure unseats the check valve 96 at the end of pipe 95, such valve being biased to its seat 97 by compression spring 98. After the valve is unseated by the pressure of the cheese, the cheese is permitted to flow downwardly through pipe 99 and through the registering aperture in the plug valve 100 to the discharge port 101. The plug valve 102 at station C may be identical except that the hole 103 to plug 102 flares in a direction longitudinally of the open wrapper therebeneath and the casing port 104 is similarly elongated as shown in Figs. 10 and 11.

Both of the plug valves 100 and 102 are normally open. The main flow of the pasteurized cheese is controlled entirely by the pistons 87 and the check valve 96 which opens in response to the pressure developed by the piston and closes as soon as such pressure is relieved at the end of the piston stroke. However, the capacity of the pasteurized cheese to flow freely, and without stringing, varies according to its temperature and other conditions. Where the flow is ideal, there is no stringiness and the valves 100 and 102 are not needed at all. However, when there is a tendency for the cheese to hang in strings from the discharge ports 101 and 104, the plug valves are highly useful, it being their function to close momentarily at the instant when delivery of the pasteurized cheese ceases. Although they reopen immediately, the momentary closing will have been adequate to cut the strings of cheese. Any cheese remaining in the spouts or pipes 99 under these conditions will stay there until the next discharge occurs.

The piston rods 88 which operate the pistons 87 in the respective cylinders 85 and 86 are respectively connected with pneumatic pistons 105 and 106 in pneumatic cylinders 107 and 108 (Fig. 23). The pneumatic connections will hereinafter be described.

At station B there are two pneumatic cylinders 110 and 111 (see Figs. 6 and 23). Cylinder 110 is disposed horizontally at the front of the machine. Its piston 112 has a rod 113 connected to a pusher 114 which is given the effect of substantial thickness by a downwardly turned flange 115 at its forward end. The pusher reciprocates in a channel 116 which extends beneath the hopper 81 and, at a point over the conveyor 44, has its bottom web 117 and its side walls downwardly flanged at 118 to provide a discharge port 120 for the cheese block 80 which has been pushed by the pusher 114 into registry with such port. There is a back wall at 121 against which the pusher holds the advanced cheese block 80 in registry with the port.

While the block of cheese remains so held under pressure of the air in cylinder 110, it is engaged by the head 122 of the transverse and immersion plunger 123 which is connected with piston 124 in the cylinder 111. The horizontal position of this head is maintained by rods 125 which connected with a cross head 126 suitably guide it about cylinder 111 for vertical reciprocation thereon. The descent of the plunger 123 causes the head 122 to engage the cheese block 80, thereby forcing it through the throat provided at 118 into the open wrapper therebeneath.

The cross head 126 carries a laterally projecting finger 127 (Figs. 3, 4 and 5). In the lowermost position of the cross head as shown in full lines in Fig. 5, the finger 127 has passed beneath a yieldable latch element 128 mounted on lever 129 as best shown in Fig. 6. The end of this latch element is beveled at 130 so that engagement of finger 127 with the beveled surface will move the latch element to the right (Fig. 6) against the compression of spring 131. As soon as the finger passes beneath the latch element, the element will spring back over the finger 127 to the position in which the parts are illustrated in Fig. 6.

In the upward movement of cross head 126 with plunger 127, the engagement of finger 127 beneath latch element 128 will cause lever 129 to oscillate clockwise as shown in the dotted line position of the parts in Fig. 5. The arcuate path followed by the free end of lever 129 will, in the continued upward movement of the cross head 126, free the lever from actuation by finger 127. Thereupon the lever will return to its original position by reason of the tension of spring 133 which is connected to the link 134 pivoted to the outer end of lever 129 (Fig. 3). This link transmits motion from lever 129 to the crank arm 135 of a rock shaft 136, other arms 138 and 139 of the rock shaft being connected by links 140 and 141, respectively, with the levers 142 and 143 of the plug valves 100 and 102. This is the means by which the plug valves are momentarily closed to cut off stringing of pasteurized cheese at the ports 101 and 104 as above described.

It is now possible to describe in detail the filling operations as performed at stations A, B and C.

The steps of advance in the intermittent operation of conveyor 44 are of such length as to register the respective molds or boxes 36 and wrapper material successively at stations A, B and C as shown in Fig. 3. At station A, the supply of air to cylinder 107 discharges the pasteurized cheese 94 contained in cylinder 85 a quantity thereof metered by the displacement of piston 87. This quantity flows from port 101 into the open wrapper as shown in Fig. 26. Meantime, the sides of this wrapper are positively held out of the way by vacuum. For this purpose, a vacuum pump, which may comprise a motor driven blower 145 has its inlet 146 connected through branch pipes 147, 148 to the vacuum pipes 149, and 150 which are plugged at their ends and have lateral inlet ports 151 spaced at short intervals along the positions occupied by the upstanding margins of wrapper 35 at stations A and C (Figs. 4, 7, 26 and 29).

As a quantity of pasteurized cheese is flowing into the mold-supported wrapper at station A, the plunger 123 at station B is simultaneously pushing a block of natural cheese downwardly into the wrapper at that station, the stroke of the plunger being sufficient to force the block 80 into the pasteurized cheese 94 and to displace a portion of such cheese upwardly around the sides and ends of the blocks to the top thereof, as shown in Fig. 28, where the plunger and pressure head are shown receding from contact with the block.

In a third mold-supported wrapper which is at station C, the admission of air into cylinder 108 has effected the discharge through the overlying port 104 of another metered quantity of pasteurized cheese 94 which, flowing over the top of the partially immersed block 80, completes the immersion thereof and fuses with the pasteurized cheese already in the wrapper.

These several operations at stations A and C occur simultaneously and during a cycle between successive advances of the conveyor 44. At each subsequent advance, an empty mold-supported wrapper is advanced to station A; a wrapper with a first deposit of pasteurized cheese is advanced from station A to station B; a wrapper with a partially immersed block of natural cheese as shown in Fig. 28 is advanced from station B to station C; and a wrapper containing a completely immersed block of natural cheese, wholly enveloped in naturalized cheese as shown in Fig. 29, is advanced from station C. At some point during the continued advance of the conveyor 44, and in some manner which is immaterial to the present invention, the mold-supported and presently filled wrappers are turned as shown in Fig. 1a so that instead of being disposed longitudinally on conveyor 44 they are disposed transversely thereon. At this stage in the operation, the wrappers are also folded shut over the contents thus introduced into them. In this condition, the wrappers have projecting end flaps 153, as shown in Fig. 1a. For the purposes hereof, these operations may be assumed to have been manually conducted during the continued movement of the conveyor 44 and without necessarily removing the work therefrom.

Figure 14:
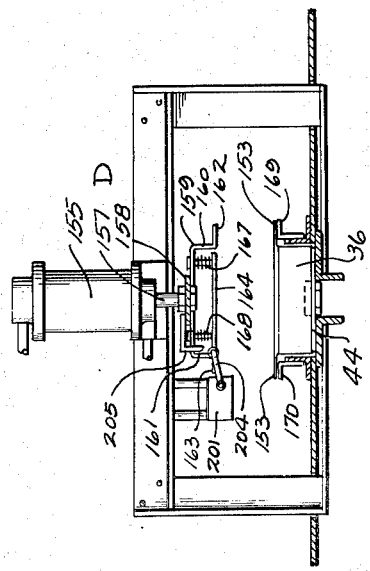
Fig. 14 is a view in transverse section on the line 14—14 of Fig. 12.
Figure 12:
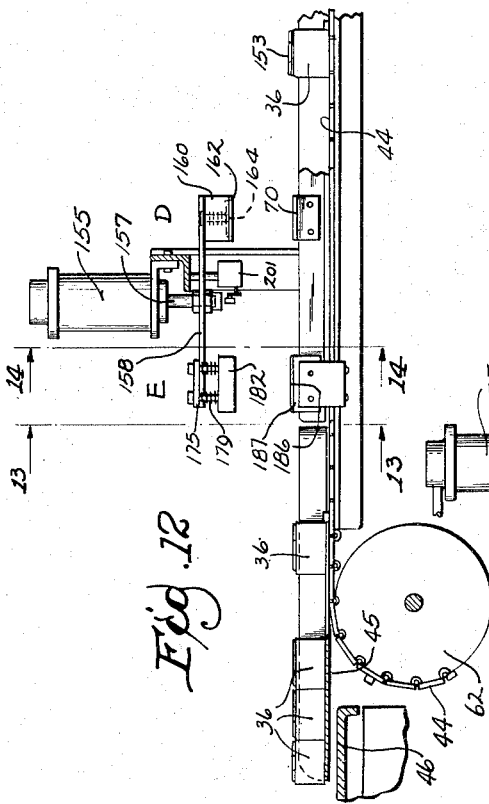
Fig. 12 is a fragmentary view partially in side elevation and partially in longitudinal section through the heat sealing portion of the apparatus.

A single cylinder 155 provides pneumatic power for the operations performed at stations D and E, Figs. 12, 13, 14 and 23. The piston 156 in this cylinder is connected with a piston rod 157 which has a cross head 158. At station D, the end of the cross head carries a yoke 159 having downwardly turned arms 160 and 161 provided at their ends with outturned flanges 162 and 163, respectively. The floating plate 164 is normally carried by bolts 165 and 166 at the level of flanges 162 and 163, toward which the plate is urged by compression springs 167 and 168 encircling the respective bolts as shown in Fig. 14.

The flanges 162 and 163 register with flanges 169 and 170 at opposite sides of the path of conveyor 44. A workpiece on the conveyor will, during one of the dwells of the conveyor, stop at station D with the outstretched flaps 153 of the package resting on flanges 169 and 170. When pressure is admitted to cylinder 155 above the piston 156 therein, the cross head will be driven downwardly, causing flanges 162 and 163 to exert clamping pressure to flatten the folded flaps 153 of the wrapper against the supporting flanges 169 and 170. At the same time, the floating plate 164 will be urged by the movement of the cross head and the compression of springs 167 and 168 against the top of the folded wrapper to flatten its creases and to press it into intimate contact with the still soft pasteurized cheese in the top of the package.

Thereupon the air will be admitted below the piston in cylinder 155 to lift the cross head; the conveyor will advance another step; and in the ensuing dwell the package will stop at station E where the wrapper will be heat sealed.

Figure 13:
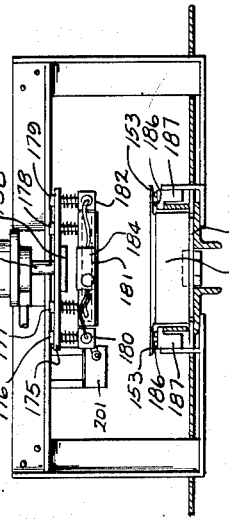
Fig. 13 is a view in transverse section on the line 13—13 of Fig. 12.

At station E the cross head 158 carries a plate 175 from which the bolts 176, 177, 178, and 179 support the heat sealing elements 180, 181 and 182 (Figs. 13 and 15). The heat sealing elements are supplied with current in the usual manner through suitable conductors leading from a junction box 184. While the details of the heat sealer form no part of the present invention, it may be noted that the sealing elements 180 and 182 have smooth lower surfaces, whereas the element 181 has its lower surface provided with parallel ribs at 181a. The ribbed element 181 will engage the top of the package as shown in Fig. 30 to seal the lapping margins of the wrapper to each other, contact being assured by the concentrated pressure of the ribs which forms longitudinally extending grooves 185 (Fig. 30).

So far as the projecting flaps 153 are concerned, these are similarly treated except that the ribs contacting the flaps are formed at 186 (Fig. 13) on blocks 187 which are unheated, and opposed to the heat sealing elements 180 and 182.

After the conveyor carries the packages beyond the heat sealer, it is withdrawn from the path of package movement by passing around the guide or sprocket 62. Successive packages thereupon push each other across the apron 45 shown in Fig. 1 and Fig. 12 until, in successive advances, the respective packages which are foremost in the line drop from the apron onto the scale platform 46. The scale is a conventional balance in which a lever 190 is connected with platform 46 at one end and with another platform 191 at its other end. The illustration is merely conventional, no attempt being made to show the actual construction. Above the scale base 192 arises a column 193 of which I availed myself to mount the housing of a sensitized switch 194 which is normally closed and has a projecting button 195, pressure on which will open the switch. A lever 196 pivoted at 197 may be moved against the button 195 to open the normally closed switch 194. The free end of the lever carries a roller 198 for anti-friction contact with the scale platform 191, the arrangement being such that if the package 36 on the scale platform 46 measures up to the predetermined weight for which the scale is adjusted, the platform 46 will be depressed and platform 191 will rise to open switch 194. However, if the package on the scale platform 46 does not measure up to the predetermined weight which it is supposed to have, the platform 191 will remain at a lower level and the switch 194 will remain closed.

This arrangement is illustrated diagrammatically in Fig. 23, which shows an electrical circuit connecting the switch 194 in series with a line terminal 199, solenoid 200, a normally open switch 201 and the other line terminal 202. The normally open switch comprises a switch lever 203 having an arm 204 in the path of a finger 205 carried by the cross head 158 of the wrapper presser at station D, as shown in Figs. 14 and 23. Until this cross head descends through the action of pneumatic pressure in cylinder 155, the contacts of switch 203 remain open and nothing happens at the scales. This gives time for the scale balance to adjust itself for the accurate weighing of the package on the platform. By the time pressure is admitted to cylinder 155, the balance will have come to rest and, if the package is then found to be underweight, switch 194 remaining closed as shown in Fig. 23, the closing of switch 201 will energize solenoid 200 to operate the ejector 207 which will push the underweight package from the scales into the receiving box 210. If the package has the required weight to depress the scale platform 46, switch 194 will be open; the ejector will fail to function when switch 201 is closed; and the package will be pushed from the scales by the next arriving package upon the next operation of conveyor 44.

As has been noted above, a single commercially available electric cycle timer, is responsible for the timing of the whole machine. This arrangement is shown diagrammatically in Fig. 23. The timer 215 has electrical connections to a solenoid 216, the armature 217 of which is attached to the operating lever 218 of a four-way rotary valve plug 219 in casing 220. The casing has pipe connections at 221 and 222 to a compressed air source and exhaust, respectively. It also has pipe connections at 223 and 224 which, in the oscillation of plug 219, are alternately placed in communication through the passages 225 and 226 of the plug with the pressure and exhaust lines.

The plug is shown in a position in which the pressure line 221 communicates with pipe 223. In this position of the parts, the conveyor 44 is at rest and, during its dwell, air is about to be admitted through the branch pipe 227 to the end of cylinder 71 to move the conveyor actuating piston 70 to its retracted position, the pawl 73 ratcheting idly over the lugs provided by the hinges of the conveyor sections.

Another branch pipe 228 is about to supply compressed air to the upper ends of the cylinders 107 and 108 to act on pistons 105 and 106 in directions to feed measured charges of pasteurized cheese into the mold-supported wrappers at stations A and C as above described. The branch pipe 228 also leads to the outer end of cylinder 110 so that compressed air admitted during this part of the cycle will retract piston 112 from the position of advance in which the pusher 114 has just delivered a block of natural cheese 80 to the position shown in Fig. 4 for discharge through the throat 118 into the mold-supported wrapper which is at station B. A regulating check valve 230 and needle valve 248 are used in this line to regulate the exhaust from cylinder 110. With check valve 230 closed, the exhaust is regulated according to the setting of needle valve 248 (Fig. 33). However, the check valve opens freely to admit compressed air behind piston 112 for the purposes of the operation just described.

Another branch 231 of pipe 223 leads to the upper end of cylinder 111 at station B (Fig. 4) to act downwardly on piston 124 for the advance of the presser 122 which delivers the cheese block 80 through the throat 118 into the wrapper, pressing it into the semi-fluid pasturized cheese already in the wrapper, an intermediate point in this operation being shown in Fig. 27.

Still another branch 232 of the pipe 223 leads to the upper end of cylinder 155 to enable the compressed air to act on piston 156 to move downwardly the cross head 158 and the wrapper clamping and heat sealing mechanism at stations D and E as shown in Figs. 12 to 15 and described above.

Incidental effects of the pneumatic operation above described include the closing of switch 201 by the cross head 158 in the scale-control ejector circuit for underweight packages; and also the closing of a switch 235 shown in Fig. 23 and not yet described.

The pusher 114 has connected with it a bracket 236 having an arm 237 on which is mounted a cam 238, these parts being shown also in Figs. 1 and 4. When the pusher is advanced to the position shown in Fig. 23 and Fig. 4, the cam follower 239 connected with the contact 240 of switch 235 has been actuated by cam 238 to open the circuit through this switch, such circuit including conductors 241 and 242 and a solenoid 41. The opening of the circuit allows the solenoid armature 40 to be retracted by a spring 42 from the position shown in Fig. 1 to that shown in Fig. 23. This allows another mold 36 and wrapper 35 to be delivered across apron 39 into the path of the armature head 243 so that, as the cheese block pusher 114 is retracted pneumatically, the consequent closing of the normally closed switch 235 will reenergize the solenoid 41 to advance it toward the position of Fig. 1, thus delivering along the conveyor trough 43 a series of wrappers, of which the forwardmost is delivered onto conveyor 44.

At the time interval for which the electric timer 215 is set, the circuit to solenoid 216 is broken, the deenergization of the solenoid allowing armature 217 to be retracted by its spring 244 to oscillate the pneumatic control valve plug 219 to its alternate position in casing 220 wherein valve passage 226 will place pipe 223 in communication with the exhaust 222 and passage 225 will place the compressed air line 221 in communication with pipe 224.

Pipe 224 is now subject to pressure. Its branch 245 leading to the bottom of cylinder 111 will retract the pushing head 122 from the wrapper into which it has pushed a cheese block 80, its retracted movement being indicated in Fig. 28 by the arrow. Branch pipe 246 will carry the compressed air to the bottom ends of cylinders 107 and 108 at stations A and C to advance the displacement for metering pistons 87 for the pasteurized cheese upwardly in cylinders 85 to receive another charge of cheese beneath the respective metering pistons as shown in Fig. 8, wherein the metering piston 87 is shown in the course of its upward movement.

Branch pipe 246 continues to the rear end of cylinder 110 to cause piston 112 and rod 113 to advance pusher 114 for the delivery of another block of natural cheese 80 from the hopper 81 toward the position shown in Fig. 4. To permit ample time for the retraction of the pushing head 122 from the wrapper (which occurs in the same part of the cycle), the needle valve 248 controlling check valve 230 is set to throttle the exhaust of air from cylinder 110 through pipe 228 and thereby to retard the otherwise rapid movement of piston 112 and pusher 114.

Another branch 249 leads from pipe 224 to the outer end of cylinder 71 to act on piston 70 therein to advance conveyor 44, the dog 73 being, in this direction of movement, engaged firmly with the lugs or ears of conveyor 44 in the manner shown in Fig. 18.

Another branch 250 of pipe 224 leads to the lower end of cylinder 155 to lift the cross head 158 and the wrapper pressing and sealing mechanisms at stations B and E.

It will be understood that the functioning of the valve 219 is such that whenever pneumatic pressure is admitted to one end of a given cylinder, the other end is placed in communication with the exhaust 223. It will further be understood that except where movement in one direction is throttled by the needle valve 248 in the case of cylinder 110 of piston ring 12, the movement of the pistons will not only be simultaneous but may take place with as great rapidity as if the entire device were electromagnetically operated. The use of pneumatic power electromagnetically controlled, instead of the use of equivalent electromagnetic pushers throughout, is simply a matter of convenience in the handling of the amount of power and the length of stroke required.

Instead of pre-cutting the cheese blocks 80 for successive delivery from the hopper 81 by the pusher 114, I may use in the hopper 810 an elongated slab 800 of cheese, from which the successive blocks 80 may be cut by some means such as that shown in Figs. 21 and 22, as incident to the delivery of the next preceding block.

In this modified embodiment of the invention, the pusher 114 and the channel 117 in which it operates are identical with the parts already described. The hopper 810 corresponds, in general, to the hopper 81 but its lower portion 811 is spaced from its upper portion 812 to provide a slot at 813 through which a cutting wire 814 mounted on bracket 815 can pass during the stroke of plunger 113 to advance the pusher 114. To give clearance for the bracket, arms 816 and 817 support the upper section 812 of the hopper from the lower section as shown in Fig. 21. Fig. 22 shows the parts in their midstroke position, the previously severed cheese block 80 being partially advanced toward registry with the throat 118 and the wire 814 having partially severed another block from the elongated strip 800 in hopper 810. It will be evident in Fig. 22 that whether the hopper is full of individual pre-cut blocks, or is filled with an elongated slab from which a single block has been, or is being severed, the more advanced increment of cheese at the bottom of the hopper would be supported on the pusher plate 114 as long as the pusher is in an advanced position. When the pusher is fully retracted to the position shown in Fig. 21, the block of cheese at the lower end of the hopper, whether pre-cut or just severed, will drop into the bottom of channel 117 to be advanced for discharge in the next operation of the pusher.

While the method here involved has already been described in the course of the description of the apparatus, it may be summarized, and the operation of the apparatus summarized, as follows: Prefabricated wrappers which are already sealed at their tops are erected in inverted positions in temporary molds which are thereupon fed step by step past a succession of stations.

In the first operating station, fluid, or semi-fluid, pasteurized cheese in measured amount, is delivered upon the wrapper in the bottom of the mold. This portion of the wrapper will ultimately be put at the top of the completed package.

The mold-supported wrapper having moved to the next station, a block of natural cheese is delivered into it and pushed into the previously delivered pasteurized cheeses, the natural cheese block being sufficiently large to nearly fill the wrapper, so that the act of pushing it into the pasteurized cheese will cause the latter to flow upwardly around the sides and ends of the block for the partial envelopment thereof.

At the next station, a further supply of pasteurized cheese is delivered on top of the first to complete the envelopment of the block. Thereafter the wrapper is folded and pressed onto the surface of the pasteurized cheese which, being still soft, bonds both to the wrapper and the block of natural cheese. The wrapper is thereupon heat sealed and is ultimately removed from the mold and inverted to bring it right-side-up.

Meantime, as an incident to the progress of the work through the machine, each package is weighed. Suitable time is allowed for the functioning of the scales and thereafter packages of inadequate weight are ejected automatically.

It is also desired to note the fact that many of the features and aspects of the present invention are by no means limited to the packaging of cheese. In these respects, the reference to cheese in this specification and the appended claims is merely illustrative.

What is claimed is:

1. In a machine for packaging material in receptacles including projecting flaps, the combination with a receptacle filler, a conveyor, and means on the conveyor for mounting the receptacles on the path of movement of the conveyor past said receptacle filler, of an apertured pipe substantially parallelling the path of the conveyor and having inlet portions at the level of one of the flaps of the receptacles as supported on said means, said pipe being provided with a vacuum connection for holding the flaps of successive receptacles aside to facilitate filling of the receptacle on said conveyor next adjacent said filler.

2. In a machine for filling receptacles having projecting flaps, the combination with a filler, a conveyor for advancing successive receptacles past the filler, and means on the conveyor for mounting the receptacles on the path of movement of the conveyor, of a vacuum pipe extending along the path of the conveyor at one side thereof and apertured to provide inlet portions disposed longitudinally of the conveyor at the level of the flaps of receptacles mounted on the conveyor, whereby to hold such flaps retracted for filling during the movement of receptacles to and from filling position and while at said position.

3. The device of claim 2 in which the inlet portions of said pipe comprise a series of ports extending longitudinally of the pipe and laterally adjacent the path of movement of receptacles on the conveyor.

4. The device of claim 2 in which a pair of vacuum pipes having opposed longitudinally extending inlet portions are disposed at opposite sides of the conveyor.

5. In a filling machine, the combination with a conveyor comprising a guideway along which receptacles to be filled are moved upon a predetermined path, and means for intermittently effecting movement of receptacles along said path to successive stations, of a first filler disposed at one of said stations and having a feeder for delivering material into a receptacle, a second filler disposed adjacent said guideway at a subsequent station and having means for delivering another material into said receptacle, and synchronized actuating connections for the intermittent operation of said movement effecting means with intervening periods of dwell and the operation of the material delivering means of the respective feeders during such periods of dwell, one of said feeders comprises a tank of fluid material, a spout leading therefrom and overhanging the path of the receptacle advance, and means affording communication between the tank and spout and including a cylinder and a valve control positive displacement member for discharging a predetermined quantity of such fluid material through the spout.

6. The device of claim 5 in which the second feeder aforesaid comprises a hopper, means for delivering successive solids from the hopper, a throat through which such solids are delivered, and a pusher reciprocably operable through the throat and into an underlying receptacle for forcing successive solids through the throat and into the receptacle and into the fluid material previously fed therein.

7. The device of claim 6 in further combination with a third feeder comprising a tank for fluid material, a metering pump communicating with the tank and a discharge spout from said pump overlying the path of movement of said receptacles at a third station, and means for operating said pump in synchronism with said movement effecting means during intervals of dwell in the operation of said means for discharging fluid material from the tank of said third feeder on top of the solid and the previous fluid material delivered into successive receptacles by the first and second feeder.

8. The device of claim 7 in further combination with a weighing scale having a scale platform positioned to be traversed by filled receptacles moved along said guideway, an ejector, an actuator for said ejector, an actuator control having a connection adapted to be actuated according to the position of said platform, whereby receptacles improperly filled by the successive functioning of said fillers will be segregated from receptacles properly filled.

9. The combination with means for advancing successive receptacles to be filled, of a hopper disposed adjacent the path of receptacle advance, a feeding throat beneath which receptacles pass in the course of their advance, means for delivering articles from the hopper through the throat into successive receptacles, a pair of feed pumps located adjacent the path of receptacle advance and provided with spouts with which receptacles register in the course of their advance, one of said spouts being located before the receptacles reach the throat and the other being located at a point after the receptacle registering therewith has passed the throat, and means for discharging measured increments of fluid material from the respective spouts into receptacles therebeneath, whereby portions of one such increment will be below and portions of another above the solid material delivered through said throat into the receptacle, said means for delivering articles through the throat comprising a plunger having a stroke sufficient to force said article into the fluid first deposited in said receptacles to cause said fluid to rise about the said articles.

10. In a filling machine, the combination with a receptacle conveyor having intermittent advance and dwell, of a guide throat opening downwardly over a position in which a receptacle dwells between intermittent advances thereof by said conveyor, a side feeder for delivering successive articles laterally to said throat and a plunger mounted for reciprocation through said throat and having an actuator of such range of movement as to operate said plunger to propel successive articles through the throat and into receptacles therebeneath, the plunger entering each receptacle in the course of its reciprocation, and means for synchronizing said actuator with said conveyor to operate during periods of dwell of the conveyor in order that said plunger may be retracted from each receptacle before the renewed advance thereof and with a discharge spout positioned before said throat in the path of receptacle advance, and a feed pump connected with the spout and having operating connections synchronized with said conveyor for discharge into successive receptacles of predetermined quantities of material during the dwell of such receptacles beneath said spout, whereby objects subsequently pushed into respective receptacles by said plunger will be forced downwardly into material previously deposited from said spout.

11. In a filling machine, the combination with a receptacle conveyor having intermittent advance and dwell, of a guide throat opening downwardly over a position in which a receptacle dwells between intermittent advances thereof by said conveyor, a side feeder for delivering successive articles laterally to said throat and a plunger mounted for reciprocation through said throat and having an actuator of such range of movement as to operate said plunger to propel successive articles through the throat and into receptacles therebeneath, the plunger entering each receptacle in the course of its reciprocation, and means for synchronizing said actuator with said conveyor to operate during periods of dwell of the conveyor in order that said plunger may be retracted from each receptacle before the renewed advance thereof and with a vacuum pipe having inlet portions extending along the conveyor opposite said spout and opposite said throat, the receptacles being provided with projecting liner flaps and the inlet portions of said pipe being at a level respecting the receptacles supported on the conveyor to engage said flaps and to hold them out of the path of work delivered from the nozzle and throat into successive receptacles.

12. A feeder for delivering a stringy liquid comprising a spout, an intermittently operable positive displacement pump for forcing such liquid through the spout and metering the quantity delivered, a check valve opening under pressure of such liquid and biased to close upon the relief of pump pressure, and a valve immediately at the outlet of said spout and comprising a normally open passage, and means for momentarily closing the valve coincidentally with the relief of pump pressure to cut off strings of liquid tending to hang from said valve.

13. A pasteurized cheese feeder comprising the combination with a tank and a cylinder opening therefrom and having a discharge spout, of a ported piston in the cylinder, a rod reciprocable through the piston and provided with means for engaging the piston upon the conclusion of a limited independent travel of said rod, said means including a valve for closing the piston port, and said spout being provided with a check valve biased to close against the flow of cheese delivered to said spout by said piston, said rod being provided with means for its reciprocation, said spout being further provided with a separate valve at the outlet end of the spout and provided with means for its mechanical operation, said last mentioned valve being normally open and said means being intermittently operable for the closing of the last mentioned valve momentarily at the conclusion of each delivery of cheese from said spout.

14. A cheese feeder comprising the combination with a hopper and a lateral channel therebeneath having a bottom wall provided at its end with a discharge throat with which the end of the channel communicates, said channel having an end wall constituting an upward extension of said throat, a pusher reciprocable in the channel from a retracted position adjacent the hopper to an advanced position adjacent the throat, and a plunger reciprocable through the throat from a retracted position above the channel to an advanced position materially below the throat, and actuating connections for the synchronous operation of the plunger and the pusher in alternation from their respective retracted positions to their respective advanced positions.

15. In a receptacle filler, the combination with a main conveyor and a plurality of feeders along said conveyor for delivering successive increments into receptacles advanced by the main conveyor, double acting pneumatic cylinders having pistons respectively connected with the individual fillers and with said conveyor, pipes leading to and from the ends of the respective cylinders, a four-way valve having pressure and exhaust connections and connections to said pipes, and a plug mounted for oscillation and having passages for connecting the pipes alternately with the supply and exhaust connections of said valve, electromagnet means for moving the plug, and an interval timer having electrical connections to said electromagnetic means for the energization thereof intermittently whereby the functioning of the pistons of the several cylinders is controlled for the synchronization of the movement of the conveyor and of said feeders by the cycle interval timer.

16. The device of claim 15 in further combination with a sealer comprising a movable die, a pneumatic cylinder and piston for the operation of said die, and connections from said cylinder to the said pipes for the synchronous operation of said sealer.

17. A device of the character described comprising a conveyor having means for its intermittent operation, filler appaartus disposed adjacent said conveyor and comprising means for filling receptacles carried by said conveyor, closing apparatus adjacent said conveyor to close the flaps of said receptacles after filling, heat sealing apparatus adjacent said conveyor for sealing said closed receptacles, and weighing apparatus to which said conveyor feeds said closed and sealed receptacles for weighing, said weighing apparatus comprising a discharge mechanism for ejecting under-weight receptacles, and means for coordinating the operation of each said apparatus, said means comprising means for actuating said conveyor intermittently and with substantial dwell between intermittent movement thereof and means for substantially simultaneously actuating said apparatus during said dwell whereby said filling, closing, sealing and discharge operations occur simultaneously, each said actuating means comprising an operating motor, a control mechanism for simultaneously energizing said motors and a timer for the control of said control means, one of said motors being connected to said conveyor for its intermittent operation.

References Cited in the file of this patent

UNITED STATES PATENTS

| | | |
|---|---|---|
| 715,336 | Apple | Dec. 9, 1902 |
| 806,103 | Burchardt | Dec. 5, 1905 |
| 1,275,661 | Clark | Aug. 13, 1918 |
| 1,295,197 | Peters et al. | Feb. 25, 1919 |
| 1,364,653 | Taliaferro | Jan. 4, 1921 |
| 1,382,141 | Stickels | June 21, 1921 |
| 1,536,420 | Carpenter | May 5, 1925 |
| 1,556,023 | Peterson et al. | Oct. 6, 1925 |
| 1,589,800 | Frank | June 22, 1926 |
| 1,883,528 | Buck | Oct. 18, 1932 |
| 1,942,267 | Warren | Jan. 2, 1934 |
| 2,031,912 | Spear | Feb. 25, 1936 |
| 2,040,436 | Howard | May 12, 1936 |
| 2,098,260 | Smith | Nov. 9, 1937 |
| 2,104,990 | Hoefler | Jan. 11, 1938 |
| 2,626,738 | Nordquist | Jan. 27, 1953 |

FOREIGN PATENTS

| | | |
|---|---|---|
| 469,017 | Great Britain | July 13, 1937 |